United States Patent [19]

Broyles et al.

[11] Patent Number: 4,891,082

[45] Date of Patent: Jan. 2, 1990

[54] TRANSFER ROLL SYSTEM

[75] Inventors: Henry D. Broyles, Uniontown; Steven J. Portalupi, Akron, both of Ohio

[73] Assignee: The Goodyear Tire & Rubber Company, Akron, Ohio

[21] Appl. No.: 935,508

[22] Filed: Nov. 26, 1986

[51] Int. Cl.$^4$ .............................................. B29D 30/08
[52] U.S. Cl. .................................... 156/123; 156/133; 156/405.1
[58] Field of Search ................. 156/405.1, 406, 406.4, 156/123, 128.1, 130.7, 133, 130.7, 415, 568; 271/95, 107; 29/116 R, 116 AD, 117

[56] References Cited

U.S. PATENT DOCUMENTS

| | | | |
|---|---|---|---|
| 3,841,941 | 10/1974 | Lebland | 156/406 |
| 3,844,871 | 10/1974 | Habert et al. | 156/362 |
| 3,852,142 | 12/1974 | Leblond et al. | 156/406.4 X |
| 3,867,228 | 2/1975 | Brinkley et al. | 156/405 |
| 3,904,471 | 9/1975 | Kubinski | 156/123 X |
| 4,053,342 | 10/1977 | Appleby et al. | 156/123 |
| 4,276,104 | 6/1981 | Riggs | 156/123 |
| 4,312,696 | 1/1982 | Bryant | 156/415 |
| 4,455,727 | 6/1984 | Tschirner | 29/116 AD X |

Primary Examiner—Michael W. Ball
Assistant Examiner—Geoffrey L. Knable
Attorney, Agent, or Firm—Frederick K. Lacher; T. P. Lewandowski

[57] ABSTRACT

A transfer roll for transferring a strip component from a conveyor to a tire building drum has an outer rim member rotatably mounted on a cylindrical ring member which is mounted on an inner hub for movement relative to the tire building drum. A pair of piston-cylinder assemblies control the movement of the cylindrical ring member to press the outer rim member against the strip component on a tire building drum. The outer rim member is rotated by a motor mounted for movement with the cylindrical ring member and the amount of rotation is controlled by control means including an encoder mounted for movement with the cylindrical ring member and in engagement with the outer ring member. A pair of the transfer rolls may be mounted on a shaft with means for adjusting the distance between the rolls after the strip components are transferred from the conveyor to the rolls in a conveyor position and moved to an intermediate adjusting position. Several sets of vacuum cups are provided around the circumference of the transfer rolls and each set has a separate vacuum pump to retain the strip component on the outer rim member.

6 Claims, 4 Drawing Sheets

TRANSFER ROLL SYSTEM

This invention relates, generally, to the transfer of strip components such as tire sidewalls from a conveyor to a tire building machine drum. Heretofore when a sidewall was applied to the drum, the pressure urging the sidewall against the drum was a function of the weight of the transfer roll and its supporting structure. There was no provision for regulating the pressure to conform with the pressure requirements for a particular sidewall material or tire design.

Where a pair of transfer rolls were used for applying two components such as two tire sidewalls simultaneously, the same pressure was applied by both rolls and no provision was made for different pressures even though the sidewalls were of different materials and did not require the same pressure. Also both transfer rolls were driven together even though the sidewall on one side had a different length than the sidewall on the other side due to the different stretchability of the material. The spacing of the transfer rolls was also fixed so that when a different spacing of the strip components was specified for a tire, the conveyor had to be adjusted to feed the sidewalls at that spacing to the transfer rolls. This was not desirable because of the difficulty and time consumed in adjusting the conveyor for different spacing of the sidewalls.

Vacuum cups have been used for holding sidewalls on the transfer rolls; however, the efficiency of the system has been dependent on actuating only those vacuum cups which were in contact with the sidewalls. If all the vacuum cups were actuated at the same time, the effectiveness of the vacuum was adversely affected or completely lost when only a few were in contact with the sidewalls.

The present invention provides an improved system in which the pressure exerted by each transfer roll against the sidewalls as it is applied to a tire building drum is controlled and is not dependent on the weight of the roll and the supporting structure. Where a pair of transfer rolls are used, the pressure applied and the rotation of the transfer rolls is individually set for each transfer roll to conform with the requirements of the particular sidewall material and configuration carried by the particular transfer roll. Furthermore, the vacuum for each set of vacuum cups is individually supplied by individual vacuum pumps so that even though only one set of vacuum cup is in engagement with the sidewall, the efficiency of the system is not adversely affected.

In accordance with one aspect of the invention there is provided an apparatus for transferring strip components from a conveyor to a drum member comprising a supporting structure, a swinging arm member pivotally mounted on the supporting structure, a pair of transfer rolls mounted on the swinging arm member in spaced-apart relation for rotation about a single axis, the swinging arm member including pivot means connected to the supporting structure for swinging of the swinging arm member from a conveyor position with the pair of transfer rolls in engagement with the conveyor for receiving the strip components to an application position with the transfer rolls in engagement with the drum member for applying the strip components to the drum member and to an intermediate position with the transfer rolls located between and spaced from the conveyor position and the application position, and means to move the transfer rolls axially along the single axis in the intermediate position to adjust the spacing of the transfer rolls to a tire spacing for application of the strip components to the drum member and to a conveyor spacing for receiving the strip components from the conveyor.

In accordance with another aspect of the invention there is provided a method of transferring a strip component from a conveyor to a drum member by a transfer roll mounted on one end of a swinging arm member having the other end pivotally mounted on a supporting structure comprising:

(a) swinging the swinging arm member to a conveyor position for moving the transfer roll into engagement with the conveyor;

(b) rotating an outer rim member of the transfer roll a predetermined amount to apply a strip component of predetermined length to the outer rim member;

(c) swinging the swinging arm member to an intermediate position;

(d) axially moving the transfer roll to adjust the position of the strip component for application to the drum member;

(e) swinging the swinging arm member to an application position in contact with the drum member; and (f) rotating the drum member to apply the strip component to the drum member.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

Figure 2:
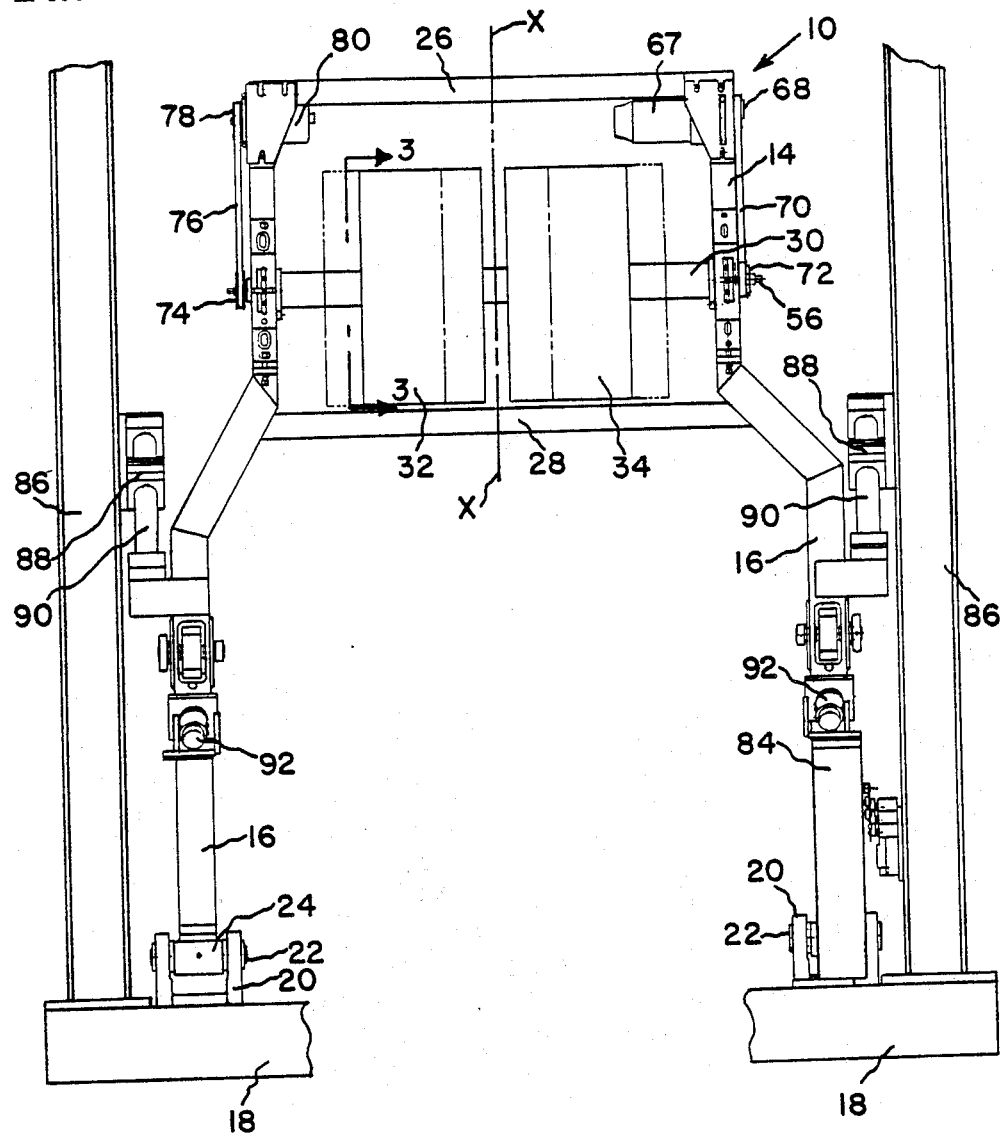
FIG. 2 is an enlarged end elevation of the swinging arm member for the transfer rolls showing the arm member and rolls in position for receiving the strip components in full lines and showing the transfer rolls in position for transferring the strip components to the tire building drum in phantom lines.

Referring to the drawings, an apparatus 10 for transferring strip components such as tire sidewalls 12 is shown. A swinging arm member of the apparatus 10, such as transfer roll frame 14, has substantially parallel side arms 16 connected to a supporting structure such as a horizontal beam 18 of a tire building machine. Pivot means such as clevises 20 are mounted on the beam 18 and have pivot pins 22 extending through bearings 24 at the lower ends of the side arms 16. The transfer roll frame 14 has an upper end tie bar 26 at the upper ends of the side arms 16 and an intermediate tie bar 28 extending between the side arms at an intermediate position spaced from the upper end tie bar. Between the upper end tie bar 26 and the intermediate tie bar 28 is mounted a tubular shaft 30 extending between the side arms 16 for supporting transfer rolls 32 and 34 in coaxial side-by-side relationship as shown in FIG. 2.

Each of the transfer rolls 32,34 has a central hub 36 slidably mounted on the shaft 30 for axial adjustment of the transfer rolls. A ring member such as cylindrical ring 38 is disposed radially outward of the hub 36 of each of the transfer rolls 32,34 and has two pairs of guide rods 40 extending between opposite sides of the cylindrical ring. The guide rods 40 are slidably disposed in bushings of slides 44 mounted on the central hub 36. The guide rods 40 may also have stop flanges 46 for limiting the movement of the slides 44 on the guide rods. Radially outward of each cylindrical ring 38 is an outer rim 47 mounted on bearings 48 for rotation around the cylindrical ring.

Mounted on the hub 36 of each of the transfer rolls 32,34 are two opposed double-acting cylinders 49 having pistons with piston rods 50, 51 connected to the cylindrical ring 38 at opposite sides of the hub 36. A suitable source of pressure fluid (not shown), which may be air or hydraulic fluid, is in communication with the cylinders 49. Control means (not shown) connected to the cylinders 49 for each of the transfer rolls 32,34 may be provided to precisely determine the pressure exerted by each rotatable outer rim 47 against the sidewall strip component 12 as it is applied to a tire building drum 54 in an application position A, as shown schematically in FIG. 1.

The hub 36 of transfer roll 32 is connected to a nut member 55 threaded on a screw 56 extending through the hollow shaft 30 by a connecting bar 58 attached to the hub and to the nut member. Slots 60 are provided in the hollow shaft 30 permitting axial movement of the connecting bar 58 along the shaft. The hub 36 of the other transfer roll 34 is connected to a nut member 62 threaded on the screw 56 by a connecting bar 64 attached to the hub and to the nut member. Slots 66 are provided in the hollow shaft 30 for movement of the connecting bar 64 axially of the shaft. The threads of the screw 56 at one side of a centerplane X—X between the transfer rolls 32,34 are of opposite hand to the threads on the other side of the centerplane so that when the screw is rotated in one direction, the transfer rolls will be moved toward the centerplane and when the screw is rotated in the other direction the transfer rolls will be moved away from the centerplane.

Referring to FIG. 2 a motor 67 is mounted on the transfer roll frame 14 and has a pulley 68 mounted on a drive shaft for driving a belt 70 extending to a pulley 72 on one end of the screw 56. A pulley 74 at the other end of the screw 56 is connected by a belt 76 to a pulley 78 on an input shaft of an encoder 80 mounted on the transfer roll frame 14 to provide an output indicative of the rotation of the screw. Suitable controls (not shown) are connected to the encoder 80 and motor 67 to activate the motor for rotating the screw 56 the desired number of revolutions in the desired direction to move the transfer rolls 32, 34 and provide the desired spacing of the sidewalls 12.

Figure 1:
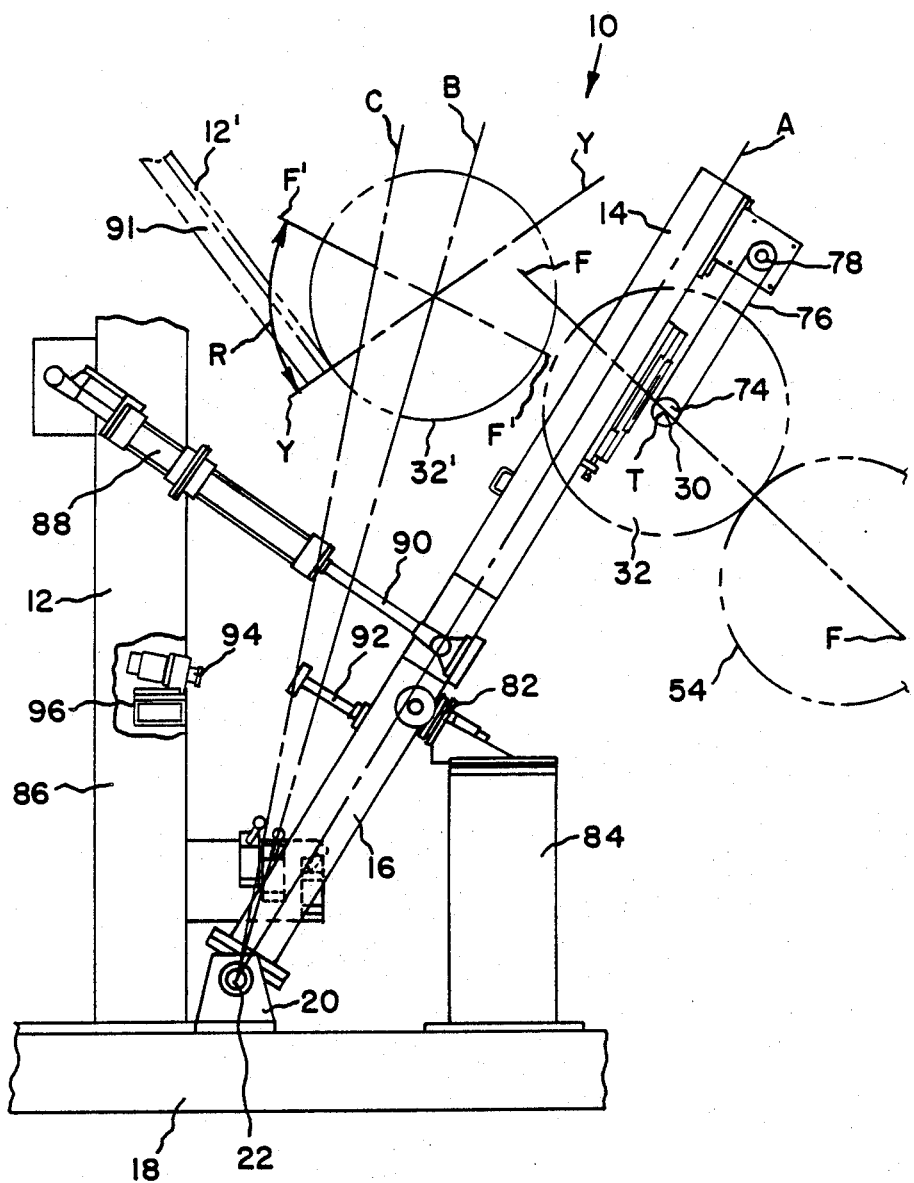
FIG. 1 is a side elevation of the transfer roll system embodying the invention in the application position with parts being broken away and the tire building drum, conveyor and conveyor position of the rolls being shown in phantom lines.

Referring to FIG. 1, the transfer roll frame 14 is in the application position A with the transfer rolls 32,34 in engagement with the tire building drum 54. The weight of the transfer roll frame 14 and the transfer rolls 32,34 is supported by a stop bracket 82 mounted on a stanchion 84 supported by the horizontal beam 18. Upright posts 86 at each side of the transfer roll frame 14 pivotally support piston and cylinder assemblies 88 having piston rods 90 pivotally connected to the side arms 16 of the transfer roll frame as shown in FIGS. 1 and 2. By retracting the piston rods 76, the transfer roll frame 14 may be swung around the pivot 22 to a conveyor position C shown in dot-dash lines with the transfer rolls 32',34' in engagement with a conveyor 91, shown in phantom lines. In the conveyor position C, stop rods 92 are pulled into engagement with stop blocks 94 mounted on a crossbar 96 connected to the posts 86. Positioning of the transfer roll frame 14 at an intermediate position B may also be provided by suitable controls for the piston and cylinder assembly 88. In the intermediate position B the transfer rolls 32,34 are out of engagement with the conveyor 91 and with the tire building drum 54 so that they may be axially adjusted between the positions shown in full lines in FIG. 2 and the positions shown dot-dash lines.

Figure 3:
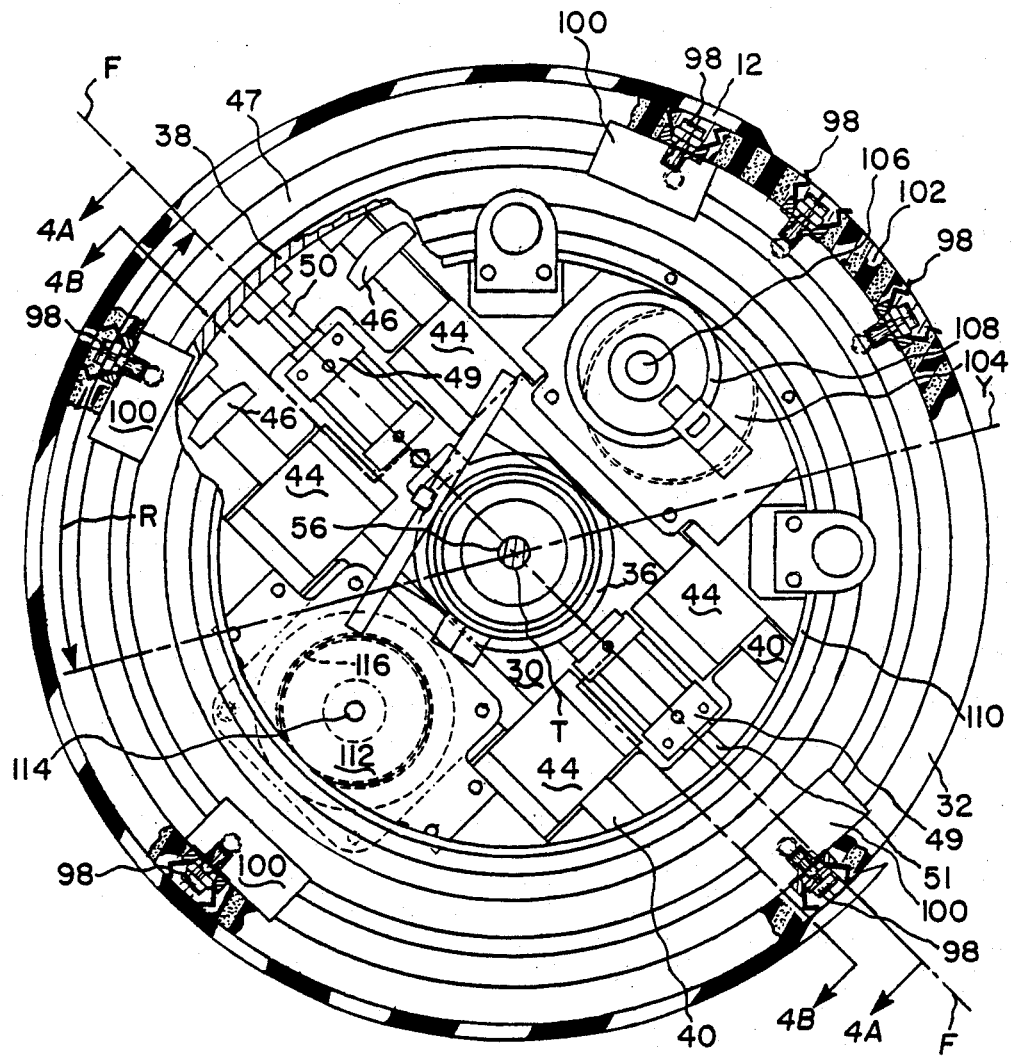
FIG. 3 is an enlarged end view of one of the transfer rolls carrying a strip component taken along line 3—3 in FIG. 2.
Figures 4A, 4B:
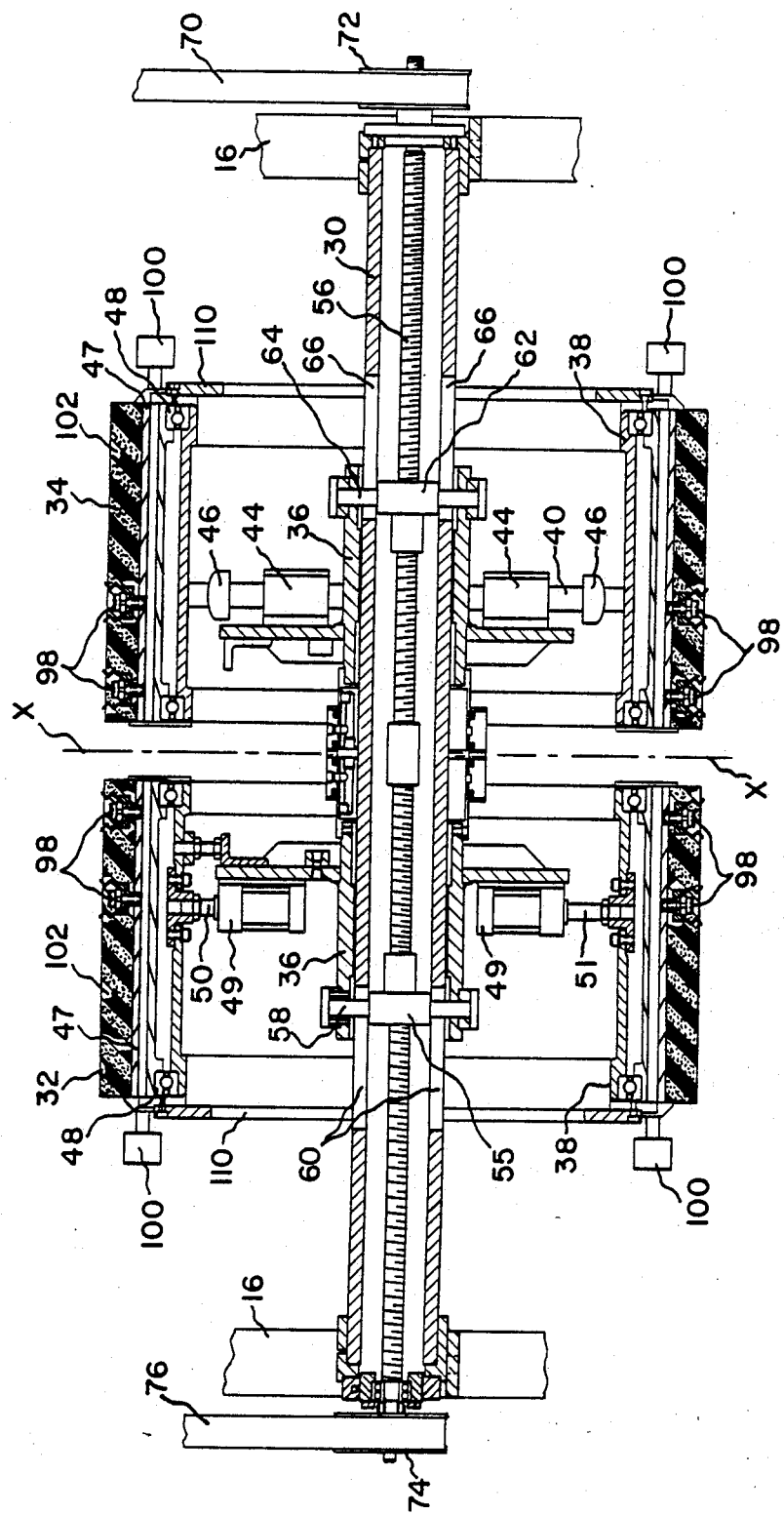
FIG. 4a is a sectional view taken along line 4a—4a in FIG. 3 showing the two piston and cylinder assemblies for the left-hand transfer roll.
FIG. 4b is a sectional view taken along line 4b—4b in FIG. 3 showing one set of guide rods for the right-hand transfer roll.

Referring to FIGS. 3, 4a and 4b, the outer rim 47 has vacuum cups 98 for holding the sidewalls 12 in position during the transfer operation as shown in FIG. 3. The vacuum cups 98 are positioned in sets of two circumferentially around the transfer rolls 32,34. Each of these sets of vacuum cups 98 has a separate vacuum pump 100 for supplying the vacuum for that particular set. At the trailing end of the sidewall 12, three sets of vacuum cups 98 may be connected to one vacuum pump 100 with a provision for switching the vacuum pump to the set which is to be used for a particular length of sidewall. Each vacuum pump 86 may be of the type in which compressed air is communicated to the pump through suitable manifolds for providing the desired vacuum. As shown in FIGS. 3, 4a and 4b, a surface layer 102 of foam such as polyurethane may be applied over the outer rim 47 so that when the sidewalls 12 are pressed against the tire building drum 54, the outer surface of the transfer rolls 32,34 may conform to the contour of the sidewalls. The surface layer 102 may also be a solid ring, if desired.

Referring to FIG. 3, a motor 104 is mounted for movement with the cylindrical ring 38 and has a drive shaft 106 on which a spur gear 108 is mounted for driving engagement with a ring gear 110 mounted on the outer rim 47. Also mounted for movement with the cylindrical ring 38 is an encoder 112 having an input shaft 114 carrying a spur gear 116 in meshing engagement with the ring gear 110 to provide an output indicative of the rotation of the outer rim 47 relative to the cylindrical ring 38.

In operation, the transfer roll frame 14 is moved to the conveyor position C by the piston and cylinder assembly 88 and stopped in the desired position by engagement of the stop rods 92 with the stop blocks 94. The transfer rolls 32,34 are in the positions shown in solid lines in FIG. 2 for receiving the sidewalls 12 from the conveyor 91 having a substantially fixed spacing between the sidewalls. As shown in FIGS. 1 and 3, the transfer rolls 32,34 are mounted on the transfer roll frame 14 for slidable movement on guide rods 40 so that an axis T of the cylindrical ring 38 is movable in a plane F—F relative to the hub 36 which is perpendicular to the surface of the tire building drum 54. This is the same plane containing the axes of piston rods 50,51 for controlling the pressure applied to the sidewalls 12 on the tire building drum 54.

As shown in FIG. 1 and 3, the transfer rolls 32',34' engage the sidewalls 12' on a conveyor 91 at a position in a plane Y—Y containing the axis of the shaft 30 which is at an angle R of approximately 60 degrees to the plane F—F so that the deflection of the transfer rolls is minimized during transfer of the sidewalls to the transfer rolls from the conveyor 91. The deflection of the transfer rolls 32',34' is also resisted by communicating substantially high pressure air to the cylinders 49 urging the piston rods 50,51 against the cylindrical ring 38. In this case the air pressure is line pressure of about 100 psi (7.03 kg/cm$^2$). At the time of transfer, the motor 104 is actuated to rotate the spur gear 108 and the ring gear 110 a predetermined amount to the conveyor position C shown in FIG. 3. The output from the encoder 112 is utilized by suitable controls to start and stop the motor 104 at the desired position with the leading ends of the sidewalls 12' at the plane F—F. When the length of the sidewall 12' on one transfer roll 32' is different than the length of the sidewall on the other transfer roll 34', the motor 104 for each of the transfer rolls can be individually operated to wrap the desired length sidewall on the transfer roll.

The piston and cylinder assemblies 88 are then actuated to move the transfer roll frame 14 to the intermediate position B where the motor 67 is actuated to turn the screw 56 and move the transfer rolls 32,34 to the desired spacing of the sidewalls 12 as shown in dot-dash lines in FIG. 2. The piston and cylinder assemblies 88 are then actuated to move the transfer roll frame 14 to the application position A shown in FIG. 1 in engagement with a stop bracket 82. In this position substantially none of the weight of the transfer roll frame 14 is pressed against the sidewalls 12 and the tire building drum 54. The pressure to be exerted against the sidewalls 12 is then applied by communicating the desired fluid pressure to the cylinders 49 causing the piston rods 50,51 to exert forces against the cylindrical ring 38 in the same direction or in opposite directions to provide the desired pressure. While this is being done, the motor 104 for each transfer roll 32,34 is disengaged to permit free rotation of the transfer rolls so that the tire building drum can be rotated to wrap the sidewalls 12 around the drum. With the individual pressure controls for each of the transfer rolls 32,34, the pressures can be regulated for the particular sidewall 12 on each of the transfer rolls. During the transfer operation with the transfer roll frame 14 in the application position A, intermediate position B and conveyor position C, each vacuum pump 100 is actuated providing vacuum at the vacuum cups 98 to hold the sidewalls 12 against the surface layer 102 of the outer rim 47. This vacuum is released at the time the sidewalls 12 are applied to the tire building drum 54.

After application of the sidewalls 12 to the tire building drum 54, the transfer roll frame 14 is moved to the intermediate position B and the motor 67 is actuated to rotate the screw 56 to move the transfer rolls 32,34 from the position shown in dot-dash lines in FIG. 2 to the position shown in solid lines. Each of the transfer rolls 32,34 is then rotated by the motor 104 to a position where the vacuum cups 98 for the leading edge of the sidewalls 12 are in alignment with the plane Y—Y, shown in FIGS. 1 and 3. The piston and cylinder assemblies 88 are then actuated to move the transfer roll frame 14 from the intermediate position B to the conveyor position C causing the transfer rolls 32,34 to move into engagement with the sidewalls 12' on the conveyor 91. The apparatus for transferring strip components 10 is now ready to repeat the operation set forth above.

While a certain representative embodiment and details have been shown for the purpose of illustrating the invention, it will be apparent to those skilled in the art that various changes and modifications may be made therein without departing from the spirit or scope of the invention.

What is claimed is:

1. Apparatus for transferring strip components from a conveyor to a tire building drum member comprising a supporting structure, a swinging arm member pivotally mounted on said supporting structure, a pair of transfer rolls mounted on said swinging arm member in spaced-apart relation for rotation about a single axis, said swinging arm member including pivot means connected to said supporting structure for swinging of said swinging arm member from a conveyor position with said pair of transfer rolls in engagement with said conveyor for receiving said strip components at a conveyor spacing to an application position with said transfer rolls in engagement with said tire building drum member for applying said strip components to said tire building drum member at a tire spacing different from said conveyor spacing and to an intermediate position with said transfer rolls located between and spaced from said conveyor position and said application position, and means not connected to said conveyor to move said transfer rolls axially along said single axis in said intermediate position to adjust the spacing of said transfer rolls to said tire spacing at a point in the course of swinging of said swinging arm member from said conveyor to said tire building drum member for application of said strip components to said tire building drum member at said tire spacing and adjust said transfer rolls to conveyor spacing at a point in the course of swinging of said swinging arm member from said tire building drum member to said conveyor for receiving said strip components from said conveyor without requiring adjustment of said conveyor to said tire spacing including a stop member mounted on said supporting structure and engageable with said swinging arm member in said application position for supporting the weight of said arm member, each of said transfer rolls having a hub member mounted on a shaft coaxial with said single axis, an outer rim member spaced radially from said hub member and movable relative to said hub member toward said tire building drum member in said application position for engagement of said outer rim member with said tire building drum member and pressure means for urging said outer rim member against said tire building drum member at a predetermined pressure, said stop member being mounted on said supporting structure such that none of the weight of said swinging arm member in said application position is pressed against said strip components and said tire building drum member prior to movement of said outer rim member against said tire building drum member.

2. Apparatus according to claim 1 wherein said outer rim member of each of said transfer rolls is rotatably mounted on a ring member, said ring member being slidably mounted for movement whereby the axis of said ring member is movable relative to said hub member in one plane to provide directional movement of said outer rim member toward or away from said tire building drum member and said pressure means controlling the pressure applied by said outer rim member against said tire building drum member in said one plane.

3. Apparatus according to claim 2 including an individual drive means for rotating said outer rim member around said ring member a predetermined distance to apply different length strip components to each of said transfer rolls.

4. Apparatus according to claim 3 wherein said outer rim member of each of said transfer rolls includes sets of vacuum cups spaced circumferentially around said outer rim member for retaining said strip components on said outer rim member in said conveyor and intermediate positions of said swinging arm member and precisely positioning said strip components on said tire building drum member in said application position, and air pressure means for operating individual vacuum pumps in communication with said sets of vacuum cups.

5. A method of transferring strip components from a conveyor to a tire building drum member by a pair of transfer rolls mounted in spaced-apart relation on one end of a swinging arm member having the other end pivotally mounted on a supporting structure comprising:

(a) swinging said swinging arm to a conveyor position for moving said transfer rolls into engagement with said conveyor;

(b) rotating an outer rim member of each of said transfer rolls a predetermined amount to apply strip components of predetermined length to said outer rim member at a conveyor spacing;

(c) swinging said swinging arm member to an intermediate position spaced from said conveyor and said tire building drum member;

(d) axially moving said transfer rolls with said strip components applied thereto without moving said conveyor to adjust the position of said strip components in said intermediate position to a tire spacing different from said conveyor spacing for application to said tire building drum member;

(e) swinging said swinging arm member to an application position for moving said transfer rolls into contact with said tire building drum member at said tire spacing; and (f) rotating said tire building drum member to apply said strip components to said tire building drum member without requiring adjustment of said conveyor to said tire spacing.

6. The method of claim 5 comprising axially moving said transfer rolls in opposite directions to adjust the positions of said strip components for application to said tire building drum member.

* * * * *